US 9,287,973 B2

(12) United States Patent
Lucamarini et al.

(10) Patent No.: US 9,287,973 B2
(45) Date of Patent: Mar. 15, 2016

(54) SYSTEM AND METHOD FOR INTENSITY MONITORING

(71) Applicant: Kabushiki Kaisha Toshiba, Minato-ku (JP)

(72) Inventors: Marco Lucamarini, Cambridge (GB); James Dynes, Cambridge (GB); Zhiliang Yuan, Cambridge (GB); Andrew James Shields, Cambridge (GB)

(73) Assignee: Kabushiki Kaisha Toshiba, Minato-ku (JP)

( * ) Notice: Subject to any disclaimer, the term of this patent is extended or adjusted under 35 U.S.C. 154(b) by 87 days.

(21) Appl. No.: 14/049,655

(22) Filed: Oct. 9, 2013

(65) Prior Publication Data

US 2014/0105598 A1 Apr. 17, 2014

(30) Foreign Application Priority Data

Oct. 12, 2012 (GB) .................................. 1218391.9

(51) Int. Cl.
*H04B 10/079* (2013.01)
*H04B 10/70* (2013.01)

(52) U.S. Cl.
CPC .......... *H04B 10/07955* (2013.01); *H04B 10/70* (2013.01)

(58) Field of Classification Search
None
See application file for complete search history.

(56) References Cited

U.S. PATENT DOCUMENTS 6,088,144 A 7/2000 Doerr
2010/0195831 A1 8/2010 Tanaka et al.

FOREIGN PATENT DOCUMENTS

GB 2 441 364 A 3/2008
WO WO 2005/057823 A1 6/2005

OTHER PUBLICATIONS

Search Report issued Oct. 15, 2013 in United Kingdom Patent Application No. GB1218391.9.
United Kingdom Search Report with Written Opinion issued Feb. 13, 2013 in GB1218391.9, filed Oct. 12, 2012.
Office Action issued on Oct. 21, 2014 in the corresponding Japanese Patent Application No. 2013-215133 (with English Translation).
Office Action issued Feb. 27, 2015 in United Kingdom Patent Application No. GB1502336.9.

*Primary Examiner* — Darren E Wolf
(74) *Attorney, Agent, or Firm* — Oblon, McClelland, Maier & Neustadt, L.L.P.

(57) ABSTRACT

A detection system for monitoring the intensity of a stream of modulated pulses, the system comprising a controller configured to provide a control signal to a component outputting modulated pulses the control signal controlling the level of modulation for each pulse exiting the component and a detector configured to measure the intensity of the pulses in the stream of pulses exiting the component outputting modulated pulses, wherein the detector comprises a gated detector, the controller being configured to send a gating signal to said detector, wherein said gating signal varies the gain of the detector with the control signal, such that pulses with a selected modulation level can be detected.

10 Claims, 3 Drawing Sheets

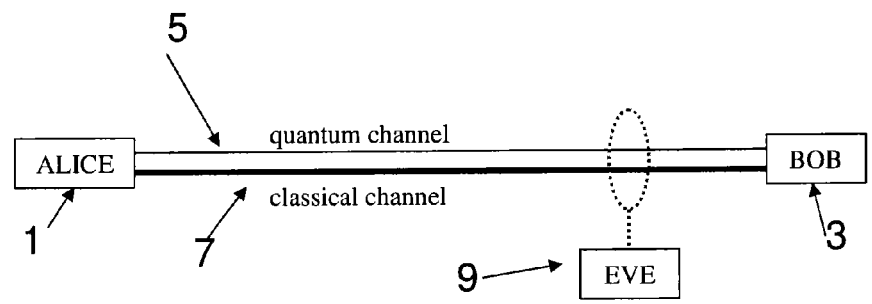
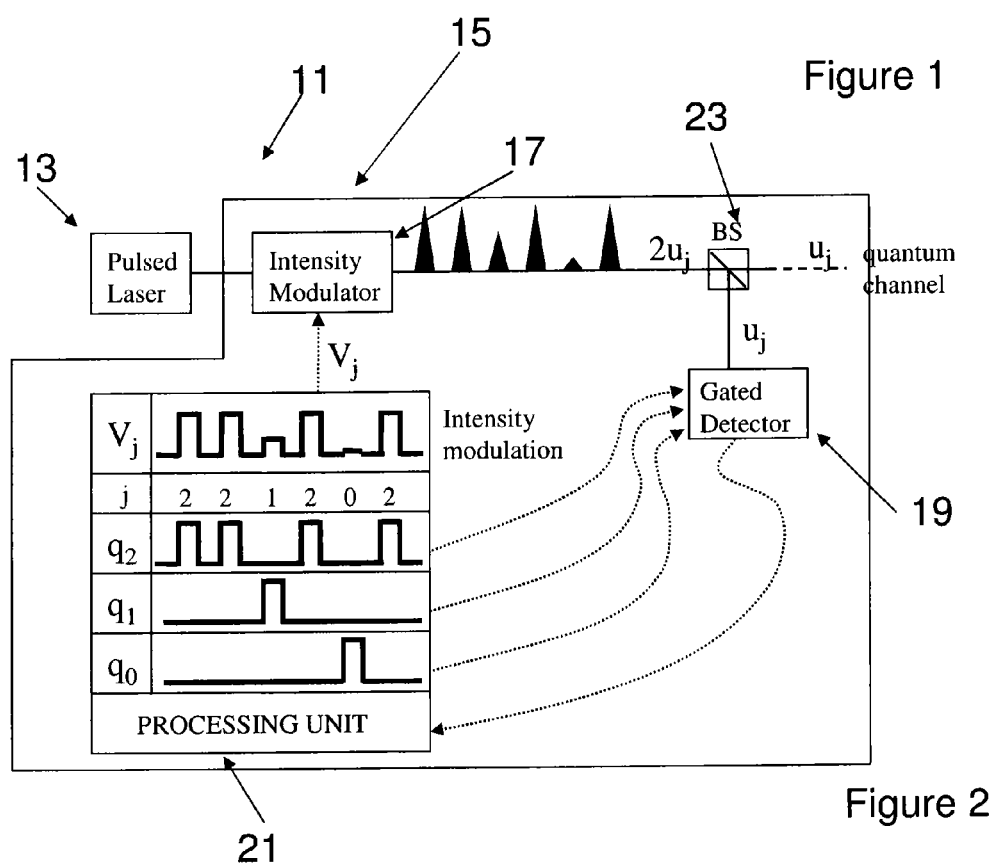
Figure 1
Figure 2

SYSTEM AND METHOD FOR INTENSITY MONITORING

FIELD

Embodiments described herein relate generally to a system and method for intensity monitoring.

BACKGROUND

Many communication systems such as quantum communication systems transmit information using a high frequency pulse train, for example, frequencies in excess of $10^8$ pulses per second. In some such systems, the pulses are transmitted with different intensities for example, to monitor security. By varying the intensity of the pulses in a quantum communication system, it is possible to monitor the security of the system by determining the number of pulses of different intensities which were successfully transmitted. Such a method requires good knowledge of the intensity of the high frequency pulses sent.

The intensity of such pulses is typically varied by an intensity modulator. However, the performance of such modulators tends to vary over time and is very susceptible to temperature fluctuations.

Also, other modulators such as phase and polarisation modulators are used to modulate high frequency pulse trains. Although such modulators do not attempt to control the intensity of the pulses, they may unintentionally vary the intensity during modulation of the polarisation/phase etc.

DETAILED DESCRIPTION

FIG. 1 is a schematic of a quantum communication system;

FIG. 2 is a schematic of a sending unit incorporating a detection system in accordance with an embodiment of the present invention;

Figure 3:
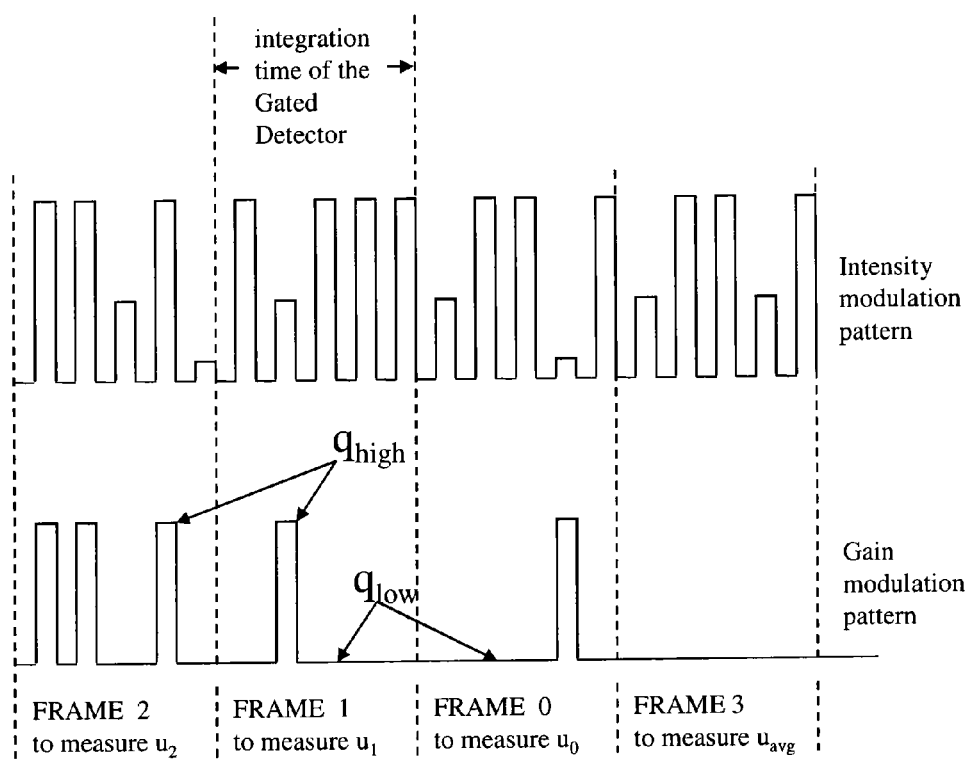
FIG. 3 is a plot of a pulse train of the modulator of FIG. 2.

In an embodiment, a detection system for monitoring the intensity of a stream of modulated pulses is provided, the system comprising a controller configured to provide a control signal to a component outputting modulated pulses the control signal controlling the level of modulation for each pulse exiting the component and a detector configured to measure the intensity of the pulses in the stream of pulses exiting the component outputting modulated pulses, wherein the detector comprises a gated detector, the controller being configured to send a gating signal to said detector, wherein said gating signal varies the gain of the detector with the control signal, such that pulses with a selected modulation level can be detected.

The above system allows the intensity of a stream of pulses to be accurately measured on a pulse by pulse basis.

In a further embodiment, the controller is configured to group the pulses into frames with each frame comprising a plurality of pulses, the controller being configured to control the gain of the detector to detect pulses modulated by a selected control signal.

In one example, the controller is configured to control the component to vary the modulation between J different levels where J is an integer of at least 1, the controller being configured to control the detector to measure over at least J frames, such that the gain of the detector is set to detect pulses of intensity level J for each of the J frames. In a further embodiment, the the gain of the detector is switched to a level not to detect pulses for at least one additional frame in order to measure the dark count level.

In an embodiment, the output of the detector is integrated over each frame. However, as the detector is gated with the control signal its gain can be increased to a detection level only for the pulses with the selected modulation within an integration period.

In one embodiment, the detector is an avalanche photodiode.

In an embodiment, the system works with a very high frequency source, for example, in excess of $10^6$ pulses per second. In other embodiments at least $10^8$ pulses per second or at least $10^9$ pulses per second. In some embodiments, the frame will last 1 second, with the sender sending at a rate of at least $10^6$ pulses per second. In other embodiments there will be at least $10^2$ or $10^3$ pulses per second. In further embodiments, longer or shorter frame lengths may be used.

The system may be configured to provide feedback from the intensity measurement to the control signal to correct for drifting intensities. For example, the controller may be configured to vary the control signal sent to the modulating component dependent on the measured intensities.

The detection system may be used in the sender of a quantum communication system. In some cases the component outputting modulated pulses is an intensity modulator. However, the component may be another type of modulator, for example a phase or polarisation modulator. Such modulators may unintentionally affect the intensity and the system can be used to detect for variations in the intensity when different modulation signals are applied, even though these modulation control signals are not intended to vary the intensity.

In a further embodiment the modulated pulses are provided by a variable intensity source, for example a pulsed laser where the intensity of the output pulses is dependent on an applied voltage and the controller is configured to control that voltage. In a further embodiment, a variable intensity source is provided by a plurality of light sources where each source is of a different intensity and the outputs of the sources are combined such that the intensity of the output can be controlled by selecting a particular source, the source may be selected using the control signal from the controller.

In further embodiment, a detection system for monitoring the intensity of a stream of modulated pulses is provided, the system comprising a controller configured to provide a control signal to a component outputting modulated pulses and a detector configured to measure the intensity of the pulses in the stream of pulses exiting the component outputting modulated pulses, the controller being configured to group the pulses into frames and control the detector to measure the average intensity of each frame, the controller being configured to apply a control signal selected from J different control signals where J is an integer of at least 1 and vary the distribution of the pulses between the frames such that J frames can be produced with a different distribution pulses subjected to the control signals in each frame, the controller being configured to associate the distribution of pulses with the detected average intensity value for each frame.

In an embodiment, the controller further comprising a calculating unit, the calculating unit being configured to receive information concerning the distribution of pulses in a frame with the detected average intensity for each frame and calculate the intensity of the pulses exiting the modulating component for each control signal applied by the controller from:

$$\langle I \rangle_j = I_{dc} + vq \sum_{j=0}^{J} u_j p(u_j)$$

Where $\langle I \rangle_j$ is the average intensity over a frame of pulses, $I_{dc}$ is the dark count current; v is the repetition rate of the light pulses; q is the "detector gain", J is the total number of levels of control signals applied to the modulating component, $u_j$ is the intensity of the pulse exiting the modulating component controlled by signal of level j; $p(u_j)$ is the probability that level j was applied to the modulator when the pulse passed through the modulating component.

In an embodiment, a method of monitoring the intensity of a stream of modulated pulses is provided, the method comprising:

outputting a stream of modulated pulses from a component;

providing a control signal to said component to modulate said pulses, the control signal controlling the level of modulation applied to each pulse by the component; and measuring the intensity of the pulses exiting the component using a gated detector, said detector being controlled using a gating signal which varies the gain of the detector such that pulses with a selected modulation level can be detected.

In an embodiment, a method of monitoring the intensity of a stream of modulated pulses is provided, the method comprising:

outputting a stream of modulated pulses from a component;

providing a control signal to said component to modulate said pulses, the control signal selected from J different modulation levels where J is an integer of at least 1;

grouping the pulses into J frames wherein the distribution of the pulses with different modulation levels is varied between the frames; and measuring the average intensity of each of the frames.

Methods in accordance with embodiments of the present invention can be implemented either in hardware or on software in a general purpose computer. Further methods in accordance with embodiments of the present can be implemented in a combination of hardware and software. Methods in accordance with embodiments of the present invention can also be implemented by a single processing apparatus or a distributed network of processing apparatuses.

FIG. 1 is a schematic of a basic quantum communication system where a sender Alice 1 sends a message to a receiver Bob 3 over a quantum communication channel 5. Alice 1 and Bob 3 can also communication over a classical channel 7. A third unauthorised party, called Eve 9, wants to eavesdrop on what they are saying.

FIG. 2 is a sender comprising an intensity modulator in accordance with an embodiment of the present invention. The sender 11 comprises a source 13 which in this case is a pulsed laser. However, the source could be a dedicated single photon source which is optically or electrically driven.

The pulsed laser produces a train of regular pulses. In some embodiments, a high frequency pulsed laser is used which emits pulses at speeds of $10^8$ pulses per second or higher.

The sender 11 further comprises an attenuator (not shown) which attenuates the output of the pulsed laser. Before the attenuator, the pulses have an average number of photon per pulse equal to $u_a$. The attenuator decreases such intensity by several orders of magnitude, to the new level $u_b$. This is done to approach the quantum regime, which requires having only a small number of photons in each pulse. In an embodiment a typical value of $u_a$ can be $10^8$ while $u_b$ is about 1. The attenuator does not necessarily precede the other parts of the sender 11 and actually in some embodiments it is put after other components in the sender 11.

Next, the pulses enter the detection system block 15. In an embodiment, the attenuated pulses go through an intensity varying component 17 where their intensity is further modified. In this particular embodiment, the modulator is an intensity modulator which modulates the intensity of a stream of pulses. However, other components which can modulate pulses may be used. For example, the component 17 may a pulsed laser source which may receive a control signal to vary the intensity of pulses output by the laser. Alternatively, the laser source may be a plurality of pulsed laser sources and the component is configured to select between the sources. The component may also be a modulator or other component which receives control signals to vary some attribute of the pulses other than intensity, but where the intensity may be unintentionally modulated as well.

The component 17 can set the average number of photons per pulse to a very precise level, as required by the particular application. For example, the component 17 can prepare three states whose average photon numbers are $u_0$, $u_1$ and $u_2$. In an embodiment 3 states are prepared. However, a different number of states can be used. In an embodiment, if the three states are used, they can be set the following values: $u_0 = 10^{-4}$, $u_1 = 0.1$ and $u_2 = 0.5$; but different values can be used.

The generic photon number value of a particular state is denoted as $u_j$, where $j = \{0, 1, 2, 3, \ldots\}$. The states $u_j$ can be prepared with different probabilities $p(u_j)$ by the component 17. It is not required that they are prepared with the same probability. For instance the state $u_2$ can be prepared with a probability of 90%, $u_1$ with a probability of 9% and $u_0$ with a probability of 1%.

In the embodiment described in relation to FIG. 2, the action of the component 17 is verified using detector 19 to ensure that the user knows the actual intensity of photons leaving the sending unit 11.

The component is controlled by controller/processor 21. In order to prepare the intensity modulation pattern showed in the figure, given by ($u_2$, $u_2$, $u_1$, $u_2$, $u_0$, $u_2$), the controller 21 will generate a voltage signal with the same pattern and will apply it to the component 17.

The output of the component 17 is then passed into beam splitter 23. In this embodiment, beam splitter 23 is a 50:50 beam splitter such that 50% of the incoming light passes through beam splitter 23 into the quantum channel and 50% is directed into detector 19. However, beams splitters with other ratios can be used. If the attenuator (not shown) is provided before the beam splitter, the attenuation provided by the attenuator will take into account the effect of the beam splitter. For example, if the pulses are to be attenuated to a level $u_j$ for entering the quantum channel, then the attenuator will attenuate the pulses to $2u_j$ and the beam splitter 23 (if a 50:50 splitter) will reduce the intensity further to $u_j$.

The beam splitter 23 then divides the pulse train and directs part of it to the quantum channel and part to detector 19. Detector 19 is a Gated Detector. This detector has the peculiarity that its response depends on an external voltage that may be applied on it. A typical example of Gated Detector is the Avalanche Photo Diode (APD) detector. In the APD, an incoming photon is initially converted into an electron-hole pair. The charges are accelerated by an electric field and generate an avalanche through the medium by impact ionisation. The secondary charges generated during the avalanche give rise to a current which is proportional to the number of incident photons. By measuring this current, the total number of impinging photons can then be known. The proportionality coefficient between the number of incident photons and the detected current is the "gain". The APD gain can be varied in the approximate range 1÷1000 by acting on the electric field responsible for the avalanche. An experimenter can control the electric field applied on the APD and thus vary its gain. The working principle of the APD is common to many Gated Detectors. The gain can be controlled between a high level ($q_{high}$) where the detector detects photons and a low level ($q_{low}$) where the detector does not detect photons.

In the system of FIG. 2, there are 3 examples of rapidly varying electric fields, depicted by square shaped patterns beside the labels "$q_2$", "$q_1$" and "$q_0$". Such patterns are chosen accordingly to measure the class j of the light pulse.

In the embodiment of FIG. 2, a modulation pattern is sent to the detector 19 from the controller 21 similar to the intensity modulation pattern sent to the component 17 with the purpose of changing the detector gain, in a way that is correlated with the intensity modulator.

FIG. 3 shows a possible way of modulating the gain in accordance with an embodiment of the invention. Here:

a first pattern is prepared to measure the class j=2. The gain of the Gated Detector is set to "$q_{high}$" in correspondence of those time slots in which the intensity modulation pattern presents a value $u_2$. In FIGS. 2 and 3 this happens in correspondence of the $1^{st}$, $2^{nd}$, $4^{th}$ and $6^{th}$ time slot. In all the other time slots the gain is set equal to a reference value that shall be denoted as "$q_{low}$". As an example, $q_{high}$~1000 and $q_{high}$~1.

A second pattern is prepared to measure the class j=1. The voltage on the Gated Detector is set to $q_{high}$ in correspondence of those time slots in which the intensity modulation pattern presents a value $u_1$. In FIGS. 2 and 3 this happens in correspondence of the $3^{rd}$ time slot. In all the other time slots the gain is set to $q_{low}$.

The same procedure is repeated for j=3 and all the other values of j.

In the top part of FIG. 3, a random pattern for the intensity modulator is given. Similarly to FIG. 2, it comprises 3 values of j: j=2, j=1 and j=0. The corresponding intensities prepared by the Intensity Modulator are then $u_2$, $u_1$ and $u_0$ respectively, randomly distributed along the sample.

The corresponding pattern for the Gated Detector gain is depicted in the bottom part of FIG. 3. It is composed by 4 sequential Frames whose lengths are related to the Gated Detector integration time, i.e., to how long the Gated Detector collects photons before providing the output current. In each Frame a different setting is arranged. In Frame 2, the setting is as such as to measure the intensity in the class j=2, $u_2$. It is followed by Frame 1, to measure $u_1$, Frame 0, to measure $u_0$, and Frame 3, to measure the average value of $u_j$, indicated by $u_{avg}$. In this latter case, the gain of the Gated Detector is set always to the lowest value, $q_{low}$. The Frames can be disposed in arrangements different from the one depicted in FIG. 3. For instance, it is possible to measure Frame 0 before Frame 1; or it is possible to measure Frame 3 after Frame 2 and again after Frame 1 and after Frame 0.

With the above technique, it is possible to access the different values $u_j$. To see that, consider the preferred embodiment with 3 intensities $u_2$, $u_1$ and $u_0$, and suppose for instance that Alice wants to measure the value of $u_2$ only. From the frame j-avg she obtains a current $$\langle I \rangle_{j\text{-}avg} = I_{dc} + vq_{low}(u_2p_2 + u_1p_1 + u_0p_0). \quad (1)$$

Then, as explained, in the frame j=2 Alice can set the gain of the Gated Detector to $q_{high}$ only in correspondence of the j=2 values of the intensity modulation pattern. As a consequence, the Gated Detector will output the following current:

$$\langle I \rangle_{j=2} = I_{dc} + vq_{high}u_2p_2 + vq_{low}(u_1p_1 + u_0p_0). \quad (2)$$

By subtracting Eq.(1) from Eq. (2) one obtains:

$$\langle \Delta I \rangle_2 = \langle I \rangle_{j=2} - \langle I \rangle_{j\text{-}avg} = v(q_{high} - q_{low})u_2p_2 \cong vq_{high}u_2p_2. \quad (3)$$

In the last passage it is considered that in every practical setting $q_{high}$ is about 3 orders of magnitude bigger than $q_{low}$. From Eq. (3) it is simple to obtain $u_2$:

$$u_2 \cong \frac{\langle \Delta I \rangle_2}{vq_{high}p_2}. \quad (4)$$

All the quantities in the numerator of Eq. (4) are known to Alice and the quantity in the denominator can be measured, so $u_2$ can be obtained. The same procedure can be repeated until all the other intensities $u_j$ are determined.

In the above embodiments, the frame length is shown as 8 pulses. However, this is for illustrative purposes only. In some embodiments the frame lengths will be at least $10^6$ pulses. In other embodiments at least $10^8$ pulses or at least $10^9$ pulses.

In some embodiments, the frame will last 1 second, with the sender sending at a rate of at least $10^6$ pulses per second. In further embodiments, longer or shorter frame lengths may be used.

In FIG. 2, a box is shown around the detection system 15. In some embodiments, the components are shielded so that one could not obtain information about the intensities sent by monitoring the gating signal.

In an embodiment, the control signal provided allows the intensity distributions to be random.

Figure 4:
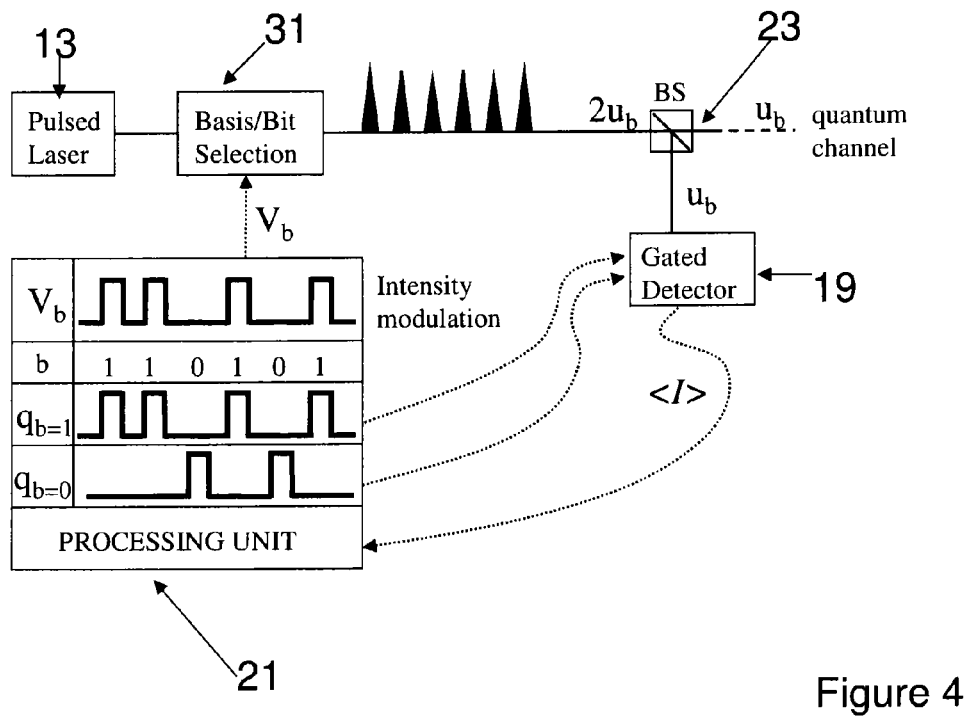
FIG. 4 is a schematic of a sending unit with a modulator used for bit/basis selection in accordance with an embodiment of the present invention.

FIG. 4 is a schematic of a sender 11 which is configured to handle Basis/Bit Selection. If the sending unit is used in a quantum communication system, the system may comprise a unit for selecting basis (Z, X) which defines the photon polarization, or its relative phase, by aligning it along the Z axis of the Poincare sphere or along the X axis of the Poincare sphere. This selection may be performed in a random way: the basis Z is selected with probability $p_Z$ ($0 \le p_Z \le 1$) and the basis X with probability $p_X = 1 - p_Z$.

The system may also comprise a unit for selecting bit values (0,1). Thus sets the value of the bit that Alice wants to transmit to Bob. In an example, if a photon has its polarisation aligned along the Z axis, then a 0 or a 1 correspond to further aligning its polarisation along the positive or the negative direction of the Z axis, respectively; all the same, if its polarisation was aligned along the X axis, then a 0 or a 1 correspond to further aligning it along the positive or the negative direction of the X axis, respectively. The same holds true if the polarisation is replaced by other degrees of freedom (DoF), like the above-mentioned relative phase. The bit selection just described is usually effected by Alice in a random way and the bit 0 and 1 are chosen with the probabilities $p_0$ and $p_1$ respectively.

When basis and bit selection are performed, the components used can modulate the intensity of the pulses. Although it is not the intention for these components to modulate the intensity.

The system of FIG. 4 is similar to that of FIG. 2 but the component 17 is replaced with Basis/Bit selection module 31. To avoid any unnecessary repetition, like reference numerals will be used to denote like features.

The intensity of the light exiting the Basis/Bit Selection box depends (slightly) on the basis modulation pattern. This is unwanted behaviour because in QKD it is important to guarantee that the outgoing intensity is independent of the selected basis.

This time the intensities coming out of the Basis/Bit Selection box would explicitly depend on a basis label "b". Such an effect should be avoided in QKD as it can cause an information leakage towards the eavesdropper. So it becomes important to measure each $u_b$ separately, to confirm that there is no such effect.

In FIG. 4, the modulation pattern for the Gated Detector gain is as follows:

a first pattern is prepared to measure the basis b=1. The voltage on the Gated Detector is set to $q_{high}$ in correspondence of those time slots in which the basis modulation pattern presents a value equal to 1. In FIG. 4 this happens in correspondence of the $1^{st}$, $2^{nd}$, $4^{th}$ and $6^{th}$ time slot. In all the other time slots the gain is set to "$q_{low}$".

A second pattern is prepared to measure the basis b=0. The voltage on the Gated Detector is set to $q_{high}$ in correspondence of those time slots in which the basis modulation pattern presents a value equal to 0. In FIG. 4 this happens in correspondence of the $3^{rd}$ and $5^{th}$ time slots. In all the other time slots the gain is set to $q_{low}$.

In addition to the Basis Selection, the same procedure can be adopted to monitor the behaviour of the Bit Selection, by providing the Gated Detector with a gain modulation pattern correlated with the bit modulation pattern.

As far as the Basis Selection is concerned, the equations are similar to those already provided in the case of the Intensity Modulation. For example, when b=1, we have:

$$\langle I \rangle_{b\text{-}avg} = I_{dc} + vq_{low}(u_{b=1}p_{b=1} + u_{b=0}p_{b=0}), \quad (5)$$

$$\langle I \rangle_{b=1} = I_{dc} + v(q_{high}u_{b=1}p_{b=1} + q_{low}u_{b=0}p_{b=0}). \quad (6)$$

By subtracting Eq. (5) from Eq. (6) we obtain:

$$\langle \Delta I \rangle_{b=1} = v(q_{high} - q_{low})u_{b=1}p_{b=1} \cong vq_{high}u_{b=1}p_{b=1}. \quad (7)$$

From Eq. (7) it is simple to obtain $u_{b=1}$:

$$u_{b=1} \cong \frac{\langle \Delta I \rangle_{b=1}}{vq_{high}p_{b=1}}. \quad (8)$$

All the quantities in the numerator are known to Alice and the quantity in the denominator can be measured by her, so $u_1$ is accessible to Alice.

In the above embodiments, tight estimates for the $u_j$ or the $u_b$ and can be applied in real time, during the very execution of QKD.

Figure 5:
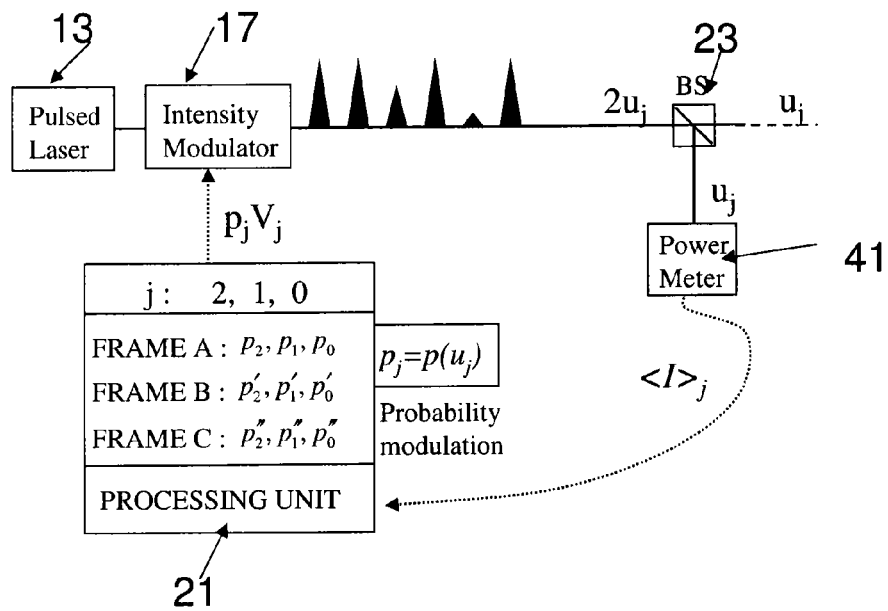
FIG. 5 is a is a schematic of a sending unit incorporating a detection system in accordance with a further embodiment of the present invention.

The above embodiments have used a gated detector. However, the embodiment of FIG. 5 uses a standard power meter. The components of the system of FIG. 5 are similar to those of FIG. 2 however the gated detector of FIG. 2 has been replaced with a power meter 41 or other type of light detector. To avoid unnecessary repetition, like reference numerals have been used to denote like features.

The Power Meter 41 receives pulses from the beam splitter (23) and is used to monitor any fluctuation occurring to the light intensity sent into the quantum channel. However, the Power Meter 41 measures the average intensity of the light impinging on it, $\langle u_j \rangle$ and not the intensity of the light in each class, $u_j$. This happens because the Power Meter does not have access to the class index "j". In an embodiment the Power Meter will have a long integration time and collects all the light pulses impinging on it for the whole duration of such a time interval. At the end of the acquisition period, the Power Meter outputs a signal which results in the average light intensity received to the controller. Thus, the resulting outcome from the Power Meter is actually averaged over all the possible values of j. The average current from the Power Meter will then have the following form:

$$\langle I \rangle_j = I_{dc} + vq \sum_{j=0}^{J} u_j p(u_j). \quad (9)$$

$I_{dc}$ is the dark count current; v is the repetition rate of the light pulses; q is a multiplicative factor, later on called the "detector gain", providing the proper dimensions to the problem; J is the total number of light intensities used in the protocol; $u_j$ is the intensity of the pulse in the class j; $p(u_j)$ is the "class probability", i.e. the probability that a pulse in the class "j" is prepared by Alice. In an embodiment of where there are 3 different intensities prepared by the Intensity Modulator, Eq. (9) is explicitly rewritten as:

$$\langle I \rangle_j = I_{dc} + vq[u_2 p(u_2) + u_1 p(u_1) + u_0 p(u_0)] \quad (10)$$

$$= I_{dc} + vq(u_2 p_2 + u_1 p_1 + u_0 p_0) \quad (11)$$

where in Eq. (9) $p(u_j) = p_j$. In the above equations, $I_{dc}$ and $u_j$ are unknown. In general, the dark current $I_{dc}$ can be measured in a separate experiment, or can be learnt from the factory specifications of the Power Meter. However, the problem tends to reduce to Eq. (9), and 2 or more unknowns, e.g. $u_2$, $u_1$ and $u_0$. Hence the problem is underdetermined and it is not possible to solve it in order to obtain the value of each $u_j$ separately.

In the system of FIG. 5, equation (9) may be solved by varying the class probabilities $p_j$, as schematically depicted in FIG. 5. In this setting, the detector gain is no more modulated and will be simply indicated with the label "q".

Considering again the preferred embodiment with the 3 values $u_2$, $u_1$ and $u_0$. Alice chooses each class j at random, with probability $p_j = p(u_j)$. As an example, $p_2$ can be about 90%, $p_1$ about 9% and $p_0$ about 1%, but different values are possible. In this case the current outputted by the Power Meter is the same as in Eq. (11). This is called the "Frame A current", with reference to FIG. 5 and to FIG. 3. In particular, the length of the Frame is defined by the Power Meter integration time, as in FIG. 3, while the label "Frame A" comes from FIG. 5 and refers to the particular choice of the triple ($p_2$, $p_1$, $p_0$). The Frame A current is given by:

$$\langle I \rangle_{FrameA} = I_{dc} + vq(u_2 p_2 + u_1 p_1 + u_0 p_0). \quad (12)$$

Alice can then choose two additional Frames in order to obtain two more equations for her linear system. When Frame B and C are chosen, the following currents are generated by the Power Meter:

$$\langle I \rangle_{FrameB} = I_{dc} + vq(u_2 p'_2 + u_1 p'_1 + u_0 p'_0) \quad (13)$$

$$\langle I \rangle_{FrameC} = I_{dc} + vq(u_2 p''_2 + u_1 p''_1 + u_0 p''_0) \quad (14)$$

With the additional knowledge of the dark current $I_{dc}$, Alice has now three equations in three unknowns and she can solve the problem for each $u_j$.

There are two constraints in the choice of the $p_j$. The first is the completeness condition:

$$\sum_j p_j = 1. \tag{15}$$

The second is the fact that the lines of the various probability sets must be linearly independent. This can be expressed through the rank of a probability matrix:

$$\operatorname{rank}\begin{pmatrix} p_2 & p_1 & p_0 \\ p'_2 & p'_1 & p'_0 \\ p''_2 & p''_1 & p''_0 \\ \ldots \end{pmatrix} \geq J, \tag{16}$$

where J is the maximum number of settings of the intensity modulator: $j=\{0,1,2,\ldots,J\}$.

The same technique can be used to monitor and or calibrate the box Basis/Bit Selection. In this case the starting equation is Eq. (5), in which the two probabilities $p_{b=1}$ and $p_{b=0}$ appear explicitly. Alice can choose two different Frames for the probabilities $p_{b=0}$ and $p_{b=1}$ so to obtain a system of two equations in two unknowns and solve it again, so to get each $u_b$ separately.

The above embodiments allow the use of a standard power meter and require little calibration.

In the embodiments described with reference to FIGS. 2 to 5, a feedback loop may be provided. For example, if the controller is provided with information concerning the required intensities outputted by the component, the controller can increase or decrease the control signal as necessary depending on the intensity measured by the detection system. Thus, the above embodiments allow a calibration system to be introduced to a quantum communication system. Although the above embodiments have shown one detection system, multiple detection systems can be provided for each component which is likely to affect the intensity. Also, multiple components may be monitored using a single detection system.

The above systems avoid problems due to unexpected deviations in intensity due to components which either intentionally or unintentionally vary the intensity. Thus the above system can avoid hidden correlations happening between bit/basis selection and intensity fluctuations.

While certain embodiments have been described, these embodiments have been presented by way of example only, and are not intended to limit the scope of the inventions. Indeed the novel methods and apparatus described herein may be embodied in a variety of other forms; furthermore, various omissions, substitutions and changes in the form of methods and apparatus described herein may be made without departing from the spirit of the inventions. The accompanying claims and their equivalents are intended to cover such forms of modifications as would fall within the scope and spirit of the inventions.

The invention claimed is:

1. A detection system for monitoring the intensity of a stream of modulated pulses, the detection system comprising:
   a pulse modulator configured to output the modulated pulses, comprising an input for receiving a control signal and an output for outputting the modulated pulses;
   a controller configured to provide the control signal to the pulse modulator, the control signal controlling a level of modulation for each pulse exiting the pulse modulator; and
   a detector configured to measure the intensity of the pulses in the stream of modulated pulses exiting the pulse modulator;
   wherein the detector comprises a gated detector, the controller being configured to send a gating signal to said detector;
   wherein said controller is configured to output the gating signal to vary a gain of the detector with the control signal,
   wherein the detector detects pulses with a selected modulation level.

2. A detection system according to claim 1, wherein the controller is configured to group the pulses into frames with each frame comprising a plurality of pulses, the controller being configured to control the gain of the detector to detect pulses modulated by a selected modulation level in each frame.

3. A detection system according to claim 2, wherein the controller is configured to control the pulse modulator to vary the modulation between J different levels where J is an integer of at least 2, the controller being configured to control the detector to measure over at least J frames, such that the gain of the detector is set to detect pulses of intensity level J for each of the J frames.

4. A detection system according to claim 2, wherein an output of the detector is integrated over each frame.

5. A detection system according to claim 1, wherein the detector is an avalanche photodiode.

6. A detection system according to claim 2, wherein each of the frames comprises at least $10^2$ pulses.

7. A detection system according to claim 1, wherein the controller is configured to vary the control signal sent to the pulse modulator dependent on the measured intensities.

8. A sending unit for a quantum communication system, comprising a source of pulses and the detection system of claim 1.

9. A sending unit according to claim 8, wherein the pulse modulator is selected from a component configured to set a basis or bit value of the pulses, an intensity modulator and a variable intensity source of pulses.

10. A method of monitoring the intensity of a stream of modulated pulses, the method comprising:
    modulating a stream of pulses at a pulse modulator;
    outputting the stream of the modulated pulses from the pulse modulator;
    generating a control signal at a controller;
    providing the control signal to said pulse modulator to modulate pulses, the control signal controlling a level of modulation applied to each pulse by the pulse modulator;
    generating a gating signal at the controller which varies a gain of a gated detector with the control signal, wherein pulses with a selected modulation level are detected at the gated detector; and
    measuring an intensity of the modulated pulses exiting the pulse modulator using the gated detector.

* * * * *